(12) United States Patent
Chang et al.

(10) Patent No.: US 11,092,484 B2
(45) Date of Patent: Aug. 17, 2021

(54) TRANSMISSIVE SAMPLING MODULE AND SPECTROMETER

(71) Applicant: InnoSpectra Corporation, Hsin-Chu (TW)

(72) Inventors: Fei-Peng Chang, Hsinchu County (TW); Hsi-Pin Li, Hsinchu County (TW); Kuo-Sheng Huang, Hsinchu County (TW)

(73) Assignee: InnoSpectra Corporation, Hsin-Chu (TW)

( * ) Notice: Subject to any disclaimer, the term of this patent is extended or adjusted under 35 U.S.C. 154(b) by 0 days.

(21) Appl. No.: 16/828,978

(22) Filed: Mar. 25, 2020

(65) Prior Publication Data

US 2020/0309596 A1 Oct. 1, 2020

(30) Foreign Application Priority Data

Mar. 29, 2019 (CN) .......................... 201910247723.4

(51) Int. Cl.
*G01N 21/25* (2006.01)
*G01J 3/02* (2006.01)

(52) U.S. Cl.
CPC ........... *G01J 3/0202* (2013.01); *G01J 3/0291* (2013.01); *G01N 21/25* (2013.01)

(58) Field of Classification Search
CPC .................. G01J 3/0202; G01J 3/0291; G01N 2021/0357; G01N 2021/0367; G01N 21/03
See application file for complete search history.

(56) References Cited

U.S. PATENT DOCUMENTS

| | | | |
|---|---|---|---|
| 4,640,617 A | 2/1987 | Hughes et al. | |
| 5,616,923 A * | 4/1997 | Rich | G01N 21/0303 250/338.5 |
| 10,928,310 B2 * | 2/2021 | Wissmann | G01N 21/31 |
| 10,962,486 B2 * | 3/2021 | Mannhardt | G01B 21/047 |
| 2006/0009707 A1* | 1/2006 | Daniels | G01N 21/3504 600/532 |
| 2010/0238437 A1* | 9/2010 | Hicks | G01J 3/443 356/311 |
| 2019/0185228 A1* | 6/2019 | Gebetsroither | B65D 51/1611 |
| 2019/0204149 A1 | 7/2019 | Huang et al. | |

FOREIGN PATENT DOCUMENTS

CN 207832666 9/2018

* cited by examiner

*Primary Examiner* — Maurice C Smith
(74) *Attorney, Agent, or Firm* — JCIPRNET

(57) ABSTRACT

A transmissive sampling module used to fix a test object to allow a spectrometer body to obtain optical information of the test object and includes a bearing base, a light emitting element, an adapter element and a sample accommodating device. The bearing base includes a first accommodating tank body. The light emitting element is disposed in the bearing base and used to emit an illumination beam. The adapter element is disposed in the first accommodating tank body and further includes a body portion and an abutting rib extending from the body portion. The body portion and the abutting rib jointly form a second accommodating tank body. The sample accommodating device at least partially surface-contacts with a second tank surface through a second light exit. A spectrometer having the transmissive sampling module is provided.

23 Claims, 12 Drawing Sheets

TRANSMISSIVE SAMPLING MODULE AND SPECTROMETER

CROSS-REFERENCE TO RELATED APPLICATION

This application claims the priority benefit of China application serial no. 201910247723.4, filed on Mar. 29, 2019. The entirety of the above-mentioned patent application is hereby incorporated by reference herein and made a part of this specification.

BACKGROUND

Field of the Invention

The invention is directed to a sampling module and a spectrometer and more particularly, to transmissive sampling module and a spectrometer having the transmissive sampling module.

Description of Related Art

In the related art, a transmissive spectrometer is operated mainly based on a principle that a light emitting element emits an illumination beam, the illumination beam passes through a lens set and a test object, and then, the test object absorbs a part of wavelength band of the illumination beam to correspondingly generate a sample beam. The sample beam passing through a slit of a spectrometer body enters the spectrometer body, such that the spectrometer body receives the sample beam and obtains information related to the test object according to this sample beam.

However, when the test object is placed in a sample tank, the sample tank has a shape in inconsistency with a shape of an accommodation tank in the transmissive spectrometer. As a result, the sample tank fails to be effectively limited by the accommodation tank, such that the test object is inclined or displaced during a process of sampling, causing the test object to deviate from an optical axis of the illumination beam during the process of sampling. Addition, it results in significant error to the measurement and causes instability as well as inaccuracy to measurement results obtained by the transmissive spectrometer.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention provides a transmissive sampling module capable of providing a stable sample beam to a spectrometer body for a transmissive spectrometer applying the transmissive sampling module can provide measurement results with high reproducibility and accuracy.

The invention provides a transmissive spectrometer capable of providing measurement results with high reproducibility and accuracy.

A transmissive sampling module provided in an embodiment of the invention is configured to fix a test object to allow a spectrometer body to obtain optical information of the test object. The transmissive sampling module includes a bearing base, a light emitting element, a adapter element and a sample accommodating device. The bearing base includes a first accommodating tank body. The first accommodating tank body includes a first tank surface and a second tank surface opposite to each other, a first light entrance located at the first tank surface and a first light exit located at the second tank surface. The light emitting element is disposed in the bearing base and is configured to emit an illumination beam. The adapter element is disposed in the first accommodating tank body. The adapter element further includes a body portion and an abutting rib extending from the body portion. The body portion and the abutting rib jointly form a second accommodating tank body. The second accommodating tank body includes a third tank surface and a fourth tank surface opposite to each other, a second light entrance located at the third tank surface and a second light exit located at the fourth tank surface. The sample accommodating device is disposed in the second accommodating tank body and at least partially surface-contacts with the second tank surface via the second light exit.

A transmissive spectrometer provided in an embodiment of the invention is configured to fix a test object to obtain optical information of the test object. The spectrometer includes the abovementioned transmissive sampling module, a protective housing and a spectrometer body. The transmissive sampling module is disposed in the protective housing. The spectrometer body is disposed in the protective housing and connected with the bearing base.

To sum up, the embodiments of the invention can achieve at least one of the following advantages or effects. In the transmissive sampling module and the spectrometer of the embodiments of the invention, because the adapter element is disposed between the sample accommodating device and the first accommodating tank body of the bearing base, the transmissive sampling module and the spectrometer can effectively limit/fix the position of the sample accommodating device, thereby stabilizing the position of the sample accommodating device to effectively prevent the test object from deviating from the optical axis of the illumination beam. In this way, during the process of sampling, the transmissive sampling module and the spectrometer can provide a stable sample beam, so as to obtain measurement results with high reproducibility and accuracy. In the embodiments of the invention, the sample accommodating device can surface-contact with the second tank surface of the first accommodating tank body via the second light exit of the adapter element, and a distance of the sample beam from the test object to the first light exit can also be reduced. Thus, the accuracy in the measurement of the transmissive sampling module and the spectrometer of the embodiments of the invention can be increased.

Other objectives, features and advantages of the present invention will be further understood from the further technological features disclosed by the embodiments of the present invention wherein there are shown and described preferred embodiments of this invention, simply by way of illustration of modes best suited to carry out the invention.

To make the above features and advantages of the invention more comprehensible, embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

In order to conveniently describe the disposition of a transmissive sampling module 100 and a spectrometer 200 of the embodiments of the invention, the spectrometer 200 and the transmissive sampling module 100 are, for example, placed in a space formed by directions D1, D2 and D3. Each two of the directions D1, D2 and D3 are perpendicular to each other (as illustrated in FIG. 1A).

Figure 1A:
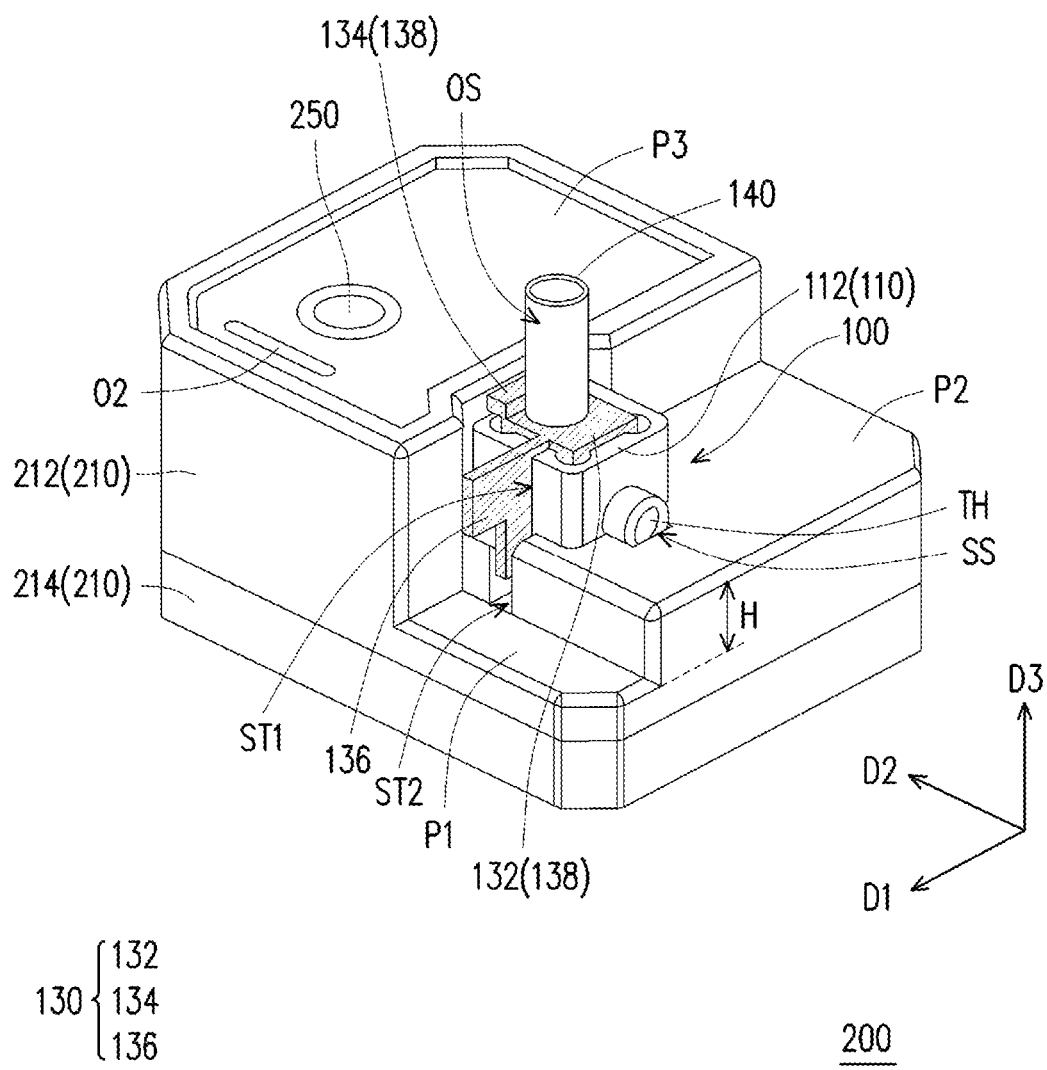
FIG. 1A and FIG. 1B are schematic appearance diagrams illustrating a spectrometer according to an embodiment of the invention in different view angles.
Figure 1B:
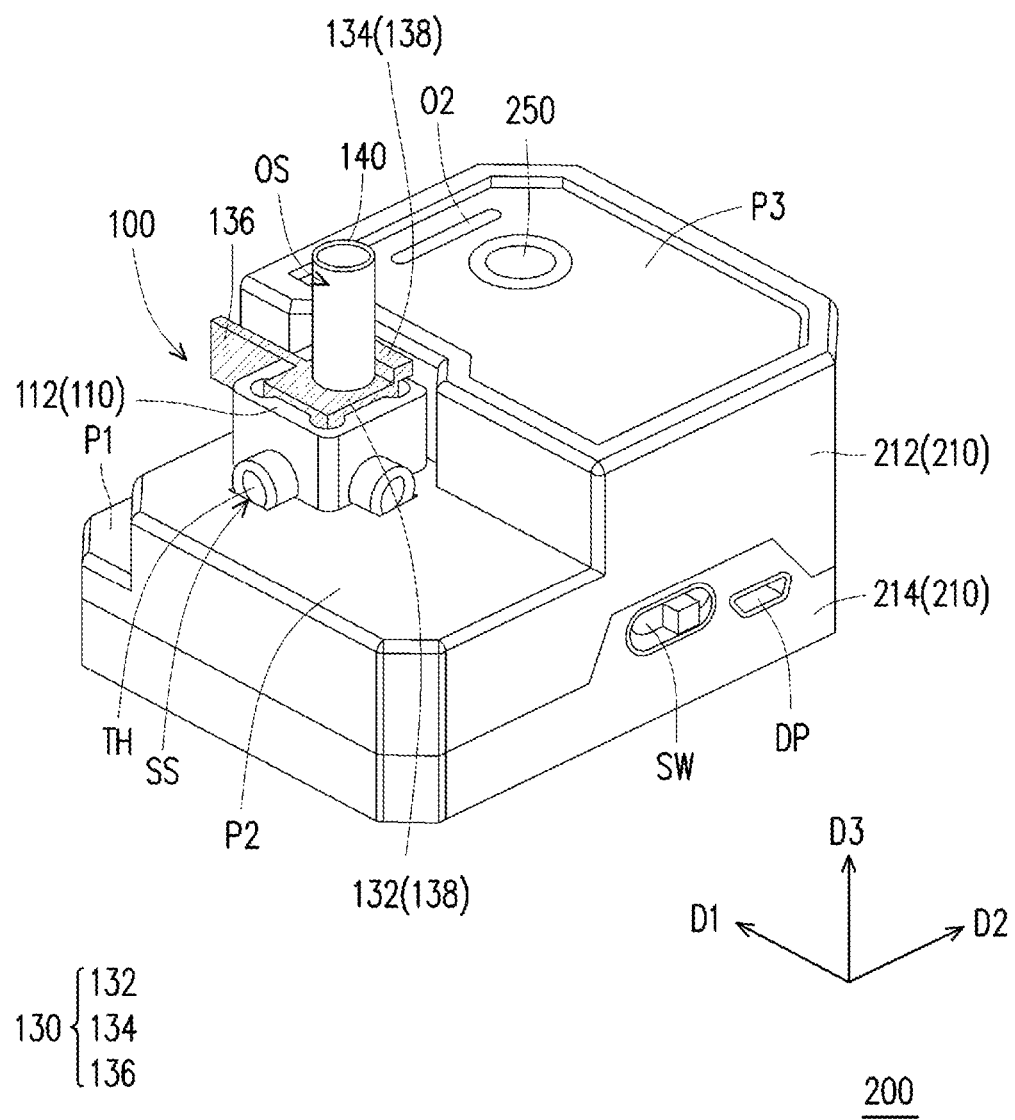
Figure 2:
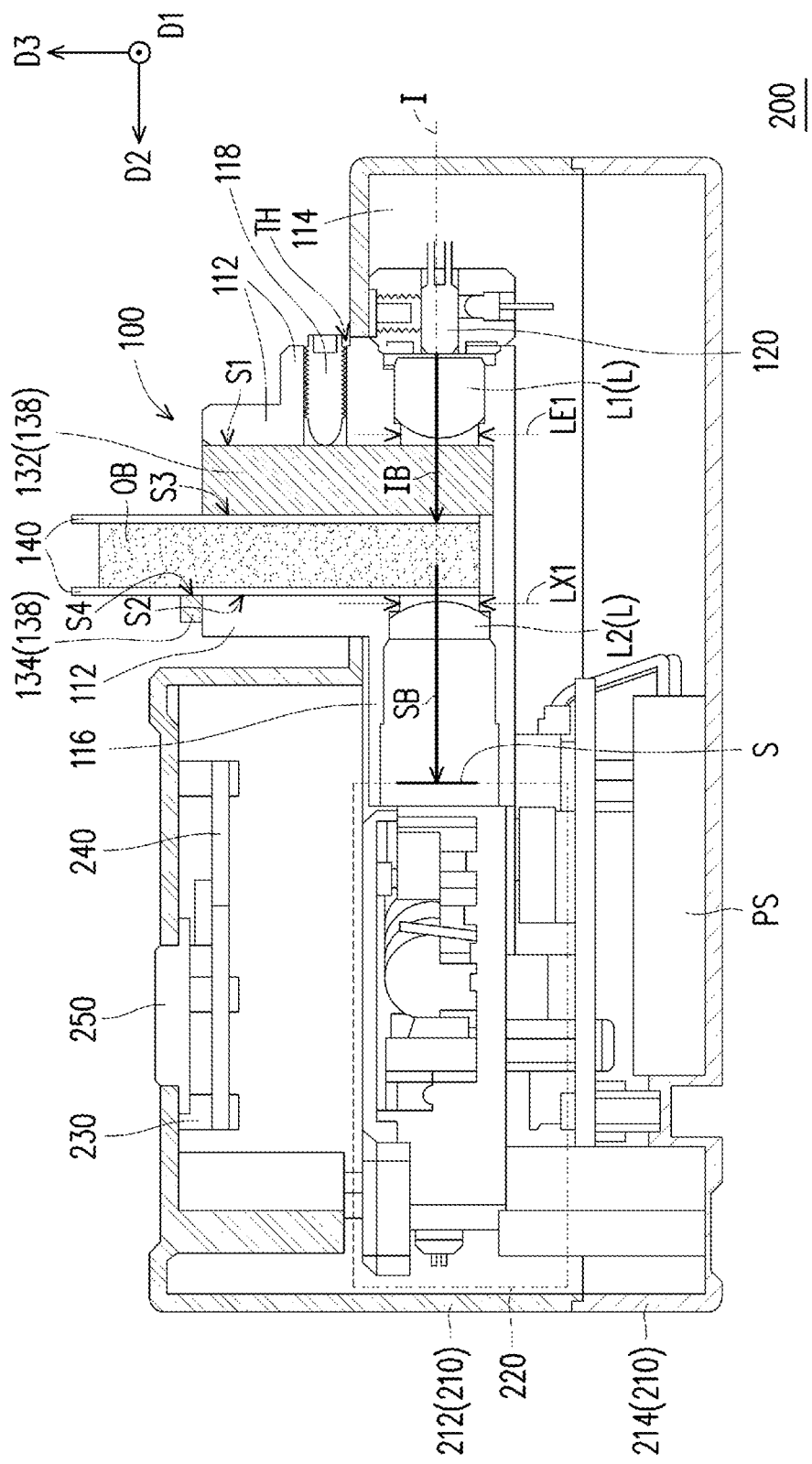
FIG. 2 is a schematic cross-sectional diagram illustrating the spectrometer depicted in FIG. 1A and FIG. 1B.
Figure 3:
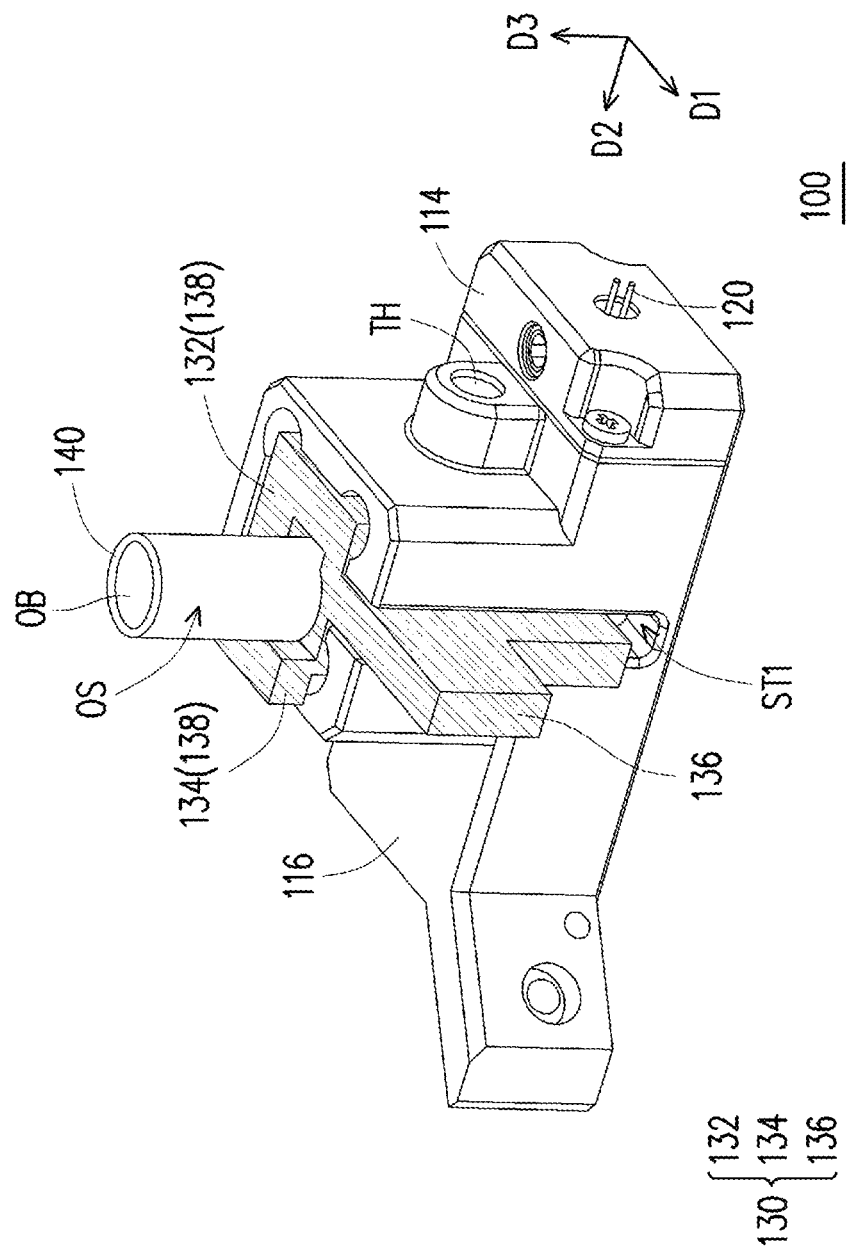
FIG. 3 is a schematic appearance diagram illustrating a transmissive sampling module.
Figure 4A:
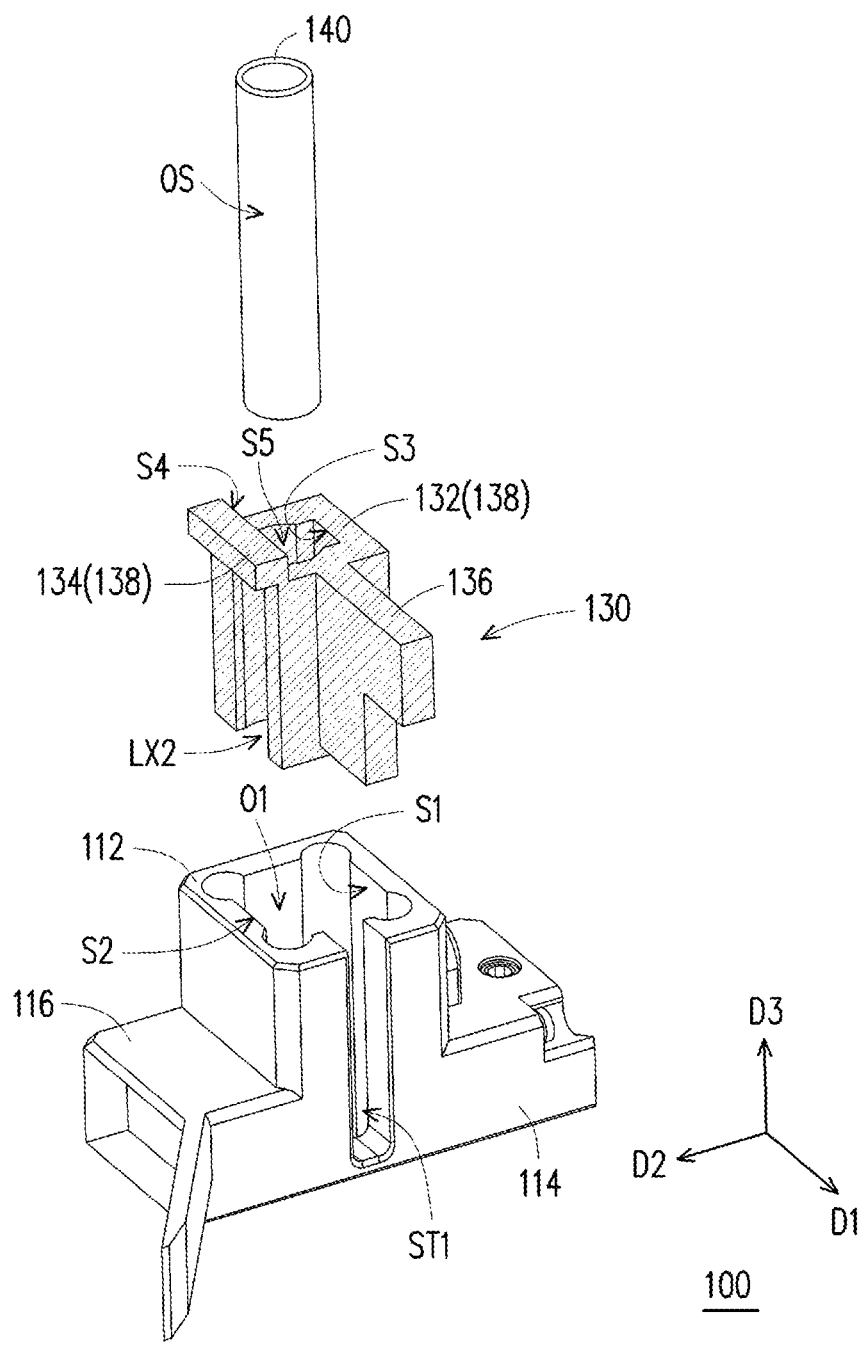
FIG. 4A and FIG. 4B are exploded diagrams illustrating the transmissive sampling module depicted in FIG. 3 in different view angles.
Figure 4B:
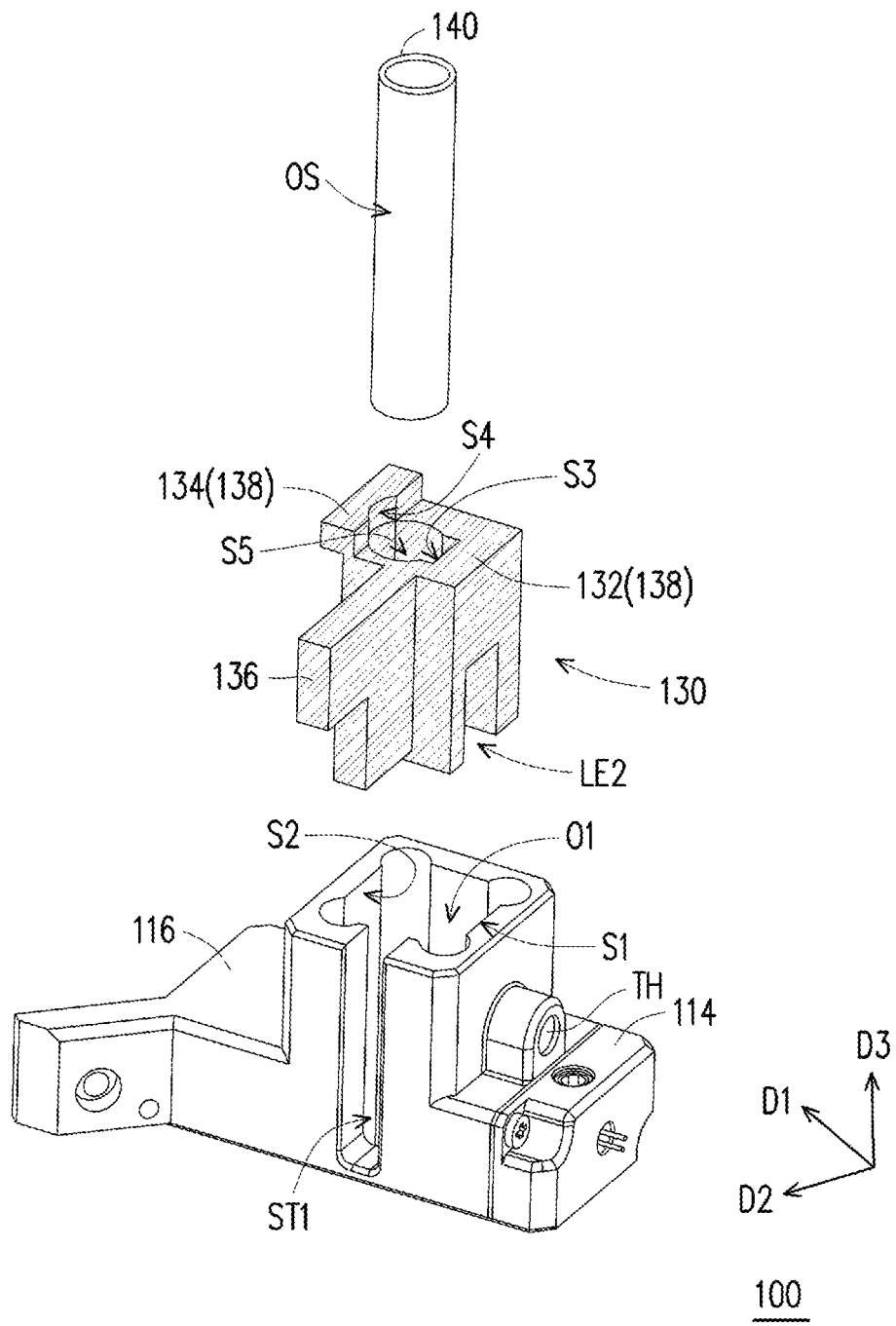

FIG. 1A and FIG. 1B are schematic appearance diagrams illustrating a spectrometer according to an embodiment of the invention in different view angles. FIG. 2 is a schematic cross-sectional diagram illustrating the spectrometer depicted in FIG. 1A and FIG. 1B. FIG. 3 is a schematic appearance diagram illustrating a transmissive sampling module. FIG. 4A and FIG. 4B are exploded diagrams illustrating the transmissive sampling module depicted in FIG. 3 in different view angles.

Referring to FIG. 1A, FIG. 1B, FIG. 2, FIG. 3, FIG. 4A and FIG. 4B, in the present embodiment, the spectrometer 200 includes the transmissive sampling module 100, a protective housing 210, a spectrometer body 220, an indication module 230, a wireless communication module 240, a button 250 and a power supply module PS. The transmissive sampling module 100 is used to fix a test object OB to allow the spectrometer body 220 to obtain optical information of the test object OB. In the present embodiment, the test object OB is, for example, a liquid, which is not limited to the invention. Referring to FIG. 2, FIG. 3, FIG. 4A and FIG. 4B, the transmissive sampling module 100 includes a bearing base 110, a light emitting element 120, an adapter element 130, a sample accommodating device 140 and a plurality of lenses L. The disposition relationship between each element will be described in detail below.

First, the disposition relationship between each element in the transmissive sampling module 100 is introduced.

Referring to FIG. 2, FIG. 3, FIG. 4A and FIG. 4B, the bearing base 110 includes a first accommodating tank body 112, a first end portion 114, a second end portion 116 and a positioning element 118. The first end portion 114 and the second end portion 116 protrude from two opposite sides of the first accommodating tank body 112 and are connected with the first accommodating tank body 112. The bearing base 110 is connected with the spectrometer body 220 via the second end portion 116. The first accommodating tank body 112 includes a first tank surface S1 and a second tank surface S2 opposite to each other, wherein the first tank surface S1 includes a first light entrance LE1, and the second tank surface S2 includes a first light exit LX1. The first accommodating tank body 112 further includes a first opening O1 and a first slot ST1, wherein an extension direction of the first accommodating tank body 112, an extension direction of the first slot ST1 and an opening direction of the first opening O1 are the direction D3. The positioning element 118 is a screw, for example, but the invention is not limited thereto. The first tank surface S1 further has a through hole TH, and the through hole TH is, for example, a screw hole. In the present embodiment, the positioning element 118 penetrating the through hole TH may make at least a part of the positioning element 118 protrude from the through hole TH. Thus, the positioning element 118 may make the adapter element 130 (a body portion 132, for example) abut against the second tank surface S2, but the invention is not limited thereto. In an embodiment, the positioning element 118 may make an abutting rib 134 abut against the first accommodating tank body 112 of the bearing base 110, i.e., the second tank surface S2 is connected with the abutting rib 134. The light emitting element 120 generally refers to an optical element with a light emitting function, and a type thereof includes, for example, a tungsten lamp, a mercury lamp, a deuterium lamp, an xenon lamp, a light emitting diode (LED), an organic light emitting diode (OLED) or a laser diode (LD), but the invention is not limited thereto. The light emitting element 120 is disposed in the bearing base 110. To be detailed, the light emitting element 120 is disposed in the first end portion 114 and used to emit an illumination beam IB, and the illumination beam IB is transmitted along a direction of an optical axis I (which is the direction D2, for example) of the light emitting element 120. A wavelength range of the illumination beam IB falls within a range from 400 nm to 2400 nm, for example. A person skilled in the art may correspondingly select the light emitting element 120 of different numbers, intensities, wavelengths or types according to measurement demands thereof, and the invention is not limited thereto.

The adapter element 130 is disposed in the first accommodating tank body 112, and the adapter element 130 includes a body portion 132, the abutting rib 134 and a handle 136. Both the abutting rib 134 and the handle 136 extend from the body portion 132 and protrude from the body portion 132, wherein the abutting rib 134 protrudes from the body portion 132 and protrudes from a top surface of the body portion 132 substantially along the direction D2, and the handle 136 protrudes from the body portion 132 substantially along the direction D1. The body portion 132 and the abutting rib 134 jointly form a second accommodating tank body 138. The second accommodating tank body 138 includes a third tank surface S3, a fourth tank surface S4 and a fifth tank surface S5. The third tank surface S3 and the fourth tank surface S4 are opposite to each other, the fifth tank surface S5 is connected with the third tank surface S3 and the fourth tank surface S4, and a shape jointly formed by the third, the fourth and the fifth tank surfaces S3-S5 is, for example, like a cylindrical shape or a rectangular columnar shape, so as to at least partially fit with an outer surface OS of the sample accommodating device 140, but the invention is not limited thereto. In an embodiment, the fifth tank surface S5 may be at least two, and the fifth tank surfaces S5 are opposite to each other and are disposed symmetrically to each other, wherein each of the fifth tank surface S5 is formed between the third tank surface S3 and the fourth tank surface S4.

In the present embodiment, a second light entrance LE2 is located at the third tank surface S3. A second light exit LX2 is located at the fourth tank surface S4. In the direction D2, at least a part of the fourth tank surface S4 overlaps with the second tank surface S2, i.e., an orthographic projection of the fourth tank surface S4 in the direction D2 overlaps the second tank surface S2.

Moreover, particularly referring to FIG. 2, the sample accommodating device 140 may contact at least a part of the second tank surface S2 via the second light exit LX2. In an embodiment, the fourth tank surface S4 overlaps with the second tank surface S2 on a plane, and the plane contacts with the outer surface OS of the sample accommodating device 140.

It is to be mentioned that the adapter element 130 may be used to be embedded in the first slot ST1 via the handle 136, and the handle 136 protrudes from the first slot ST1 to prevent the adapter element 130 from moving in the direction D2, and the first slot ST1 has a position-limiting function. On the other hand, a user may apply a force to the handle 136 to quickly remove the adapter element 130 from the bearing base 110 along the extension direction D3 of the first slot ST1. In an embodiment, the first slot ST1 is slightly greater than a sectional area of the handle 136, and with the positioning element 118 protruding from the through hole TH in the direction D2 and abutting against with an outer surface of the adapter element 130, the adapter element 130 may abut toward the second tank surface S2 by this design. Moreover, the adapter element 130 is made of a light-absorbing material, and this light-absorbing material is used to absorb a light beam of an infrared band (i.e., 900 nm to 2500 nm), thereby effectively preventing infrared stray light from affecting measurement results.

The sample accommodating device 140 is used to accommodate the test object OB and is disposed in the second accommodating tank body 138. The sample accommodating device 140 at least partially surface-contacts with the fourth tank surface S4 of the second accommodating tank body 138. In another viewpoint, the second accommodating tank body 138 at least partially contacts with the outer surface OS of the sample accommodating device 140. Moreover, in the present embodiment, the sample accommodating device 140 is, for example, a cylindrical or a rectangular cylindrical sample tank, but the invention is not limited thereto. It is to be mentioned that a shape of each of the third, the fourth and the fifth tank surfaces S3-S5 of the second accommodating tank body 138 is a cylindrical shape or a rectangular cylindrical shape, and the outer surface OS of the sample accommodating device 140 is a cylindrical shape or a rectangular cylindrical shape. In other words, in the present embodiment, the tank surfaces of the second accommodating tank body 138 and the outer surface OS of the sample accommodating device 140 are at least partially conformal with each other (have the same shape). Thus, the adapter element 130 may more tightly fit with the sample accommodating device 140, such that the sample accommodating device 140 may be prevented from deviating from its initial position. In an embodiment, the optical axis I passes through a center (not shown) of the sample accommodating device 140 in the direction D1.

The lenses L are, for example, disposed on an optical path of the illumination beam IB and used to adjust the illumination beam IB. Referring to FIG. 2, in the present embodiment, the transmissive sampling module 100 includes, for example, two lenses L. The lenses L are disposed in the bearing base 110. One of the lenses L, i.e., L1, is located between the light emitting element 120 and the first light entrance LE1 to allow the illumination beam IB to pass through, and the other one of the lenses L, i.e., L2, is located between the first light exit LX1 and the spectrometer body 220 to allow a sample beam SB to pass through. In other embodiments, the person skilled in the art may correspondingly select the lenses in different numbers and shapes according to measurement demands thereof, but the invention is not limited thereto.

Thereafter, the elements of the spectrometer 200 other than the transmissive sampling module 100 are further introduced.

Referring to FIG. 1A, FIG. 1B, and FIG. 2, the protective housing 210 includes an upper cover 212 and a lower cover 214, and the transmissive sampling module 100 and the spectrometer body 220 are disposed between the upper cover 212 and the lower cover 214. The protective housing 210 is used to protect the transmissive sampling module 100.

Referring to FIG. 1A, in detail, the upper cover 212 includes a first platform portion P1, a second platform portion P2 and a third platform portion P3 connected together. A height of the third platform portion P3 is greater than a height of the second platform portion P2, and the height of the second platform portion P2 is greater than a height of the first platform portion P1. The second platform portion P2 includes a supporting slot SS and a second slot ST2. There is a height difference H between the first platform portion P1 and the second platform portion P2. A depth of the supporting slot SS is equal to the height difference H. An extension direction of the supporting slot SS and an extension direction of the second slot ST2 are the direction D3. The second slot ST2 in position is disposed corresponding to the first slot ST1 of the bearing base 110. Thus, the handle 136 of the adapter element 130 may also protrude from the second slot ST2. The second slot ST2 also has a position-limiting function. The bearing base 110 of the transmissive sampling module 100 may be disposed on the supporting slot SS of the second platform portion P2 and exposed to the outside.

On the other hand, referring to FIG. 1B, the lower cover 214 also includes a power switch opening and a transmit port opening DP. The user may turn on or turned off the spectrometer 200 via a switch SW in the power switch opening. In an embodiment, the power supply module PS is electrically connected with the light emitting element 120 and the spectrometer body 200, such that the user may turn on the spectrometer 200 via the switch SW to transmit the power to the light emitting element 120 and the spectrometer body 220, or alternatively, the user may turn off the spectrometer 200 via the switch SW to stop the power transmission.

In another embodiment, the user may connect a transmission line (not shown) to a transmit port inside the transmit port opening DP, the optical information of the test object OB may be transmitted from the transmit port to an external electronic device via the transmission line in a wired manner, and an external power supply may also charge the power supply module PS or directly supply the power to the light emitting element 120 and the spectrometer body 220 via the transmission line. Moreover, the optical information of the test object OB may be transmitted to an external electronic device (not shown, a computer, for example) via the wireless communication module 240 in a wireless manner.

Referring to FIG. 2, the spectrometer body 220 is connected with the second end portion 116 of the bearing base 110 and is disposed in the protective housing 210. An optical element (not shown) and a sensor (not shown) may be disposed inside the spectrometer body 220, wherein the optical element is used to guide an incident light beam from the slit S to the sensor for the sensor to sense the light beam. For example, the spectrometer body 220 may have a slit S and receive the light beam through the slit S.

Referring to FIG. 1A, FIG. 1B, and FIG. 2, the indication module 230 is integrated with the upper cover 212, and the indication module 230 is, for example, a light-emitting module. The light-emitting module includes, for example, an indicating light emitting element, and the indicating light emitting element is, for example, a light emitting diode (LED), but the invention is not limited thereto. An electronic button is electrically coupled to the LED, for example. In the present embodiment, when the user presses the button 250, the button 250 then correspondingly presses the electronic button, the electronic button triggers the generation of a trigger signal, and the trigger signal simultaneously triggers the indication module 230, the light emitting element 120 and the spectrometer body 220 to operate. The trigger signal may also be emitted by a processing unit, and processing unit may be, for example, a central processing unit (CPU) or any other programmable microprocessor for general or special use, a digital signal processor (DSP), a programmable controller, an application specific integrated circuit (ASIC), a programmable logic device (PLD) or other similar devices, or a processing software or a control software, but the invention is not limited to the hardware or software described above. The trigger signal is generated to trigger the indication module 230 to emit an indication signal and is used to notify the light emitting element 120 to send out the illumination beam IB and notify the spectrometer body 220 to perform an optical measurement. The indication signal is, for example, an optical signal, and the optical signal may be emitted to the user via a second opening O2 of the third platform portion P3 and used to indicate the user that the spectrometer 200 is under operation. Furthermore, the optical signal for indicating the indicating light emitting element to emit indication may also include light in different colors, and thus, the user may determine a current operating state of the spectrometer 200 according to the light in different colors, wherein the operating state is, for example, a charge state, a wireless connection state, an on state or an off state of the transmissive spectrometer 200.

Referring to FIG. 1A, FIG. 1B, and FIG. 2, the wireless communication module 240 is, for example, a Bluetooth wireless communication module and may be used to transmit the optical information of the test object OB to the external electronic device.

Referring to FIG. 2, the power supply module PS is, for example, a battery module. The power supply module PS is disposed in the lower cover 214 and used to supply power to the transmissive spectrometer 200 for being used by the user in a scenario that there is no external power.

The disposition manners of the first and the second light entrances LE1 and LE2 and the first and second light exits LX1 and LX2 in the transmissive sampling module 100 and the transmissive spectrometer 200 and how to obtain the optical information of the test object OB of the present embodiment will be described in detail below.

Referring to FIG. 2, FIG. 4A, and FIG. 4B, the first light entrance LE1 and the second light entrance LE2 are located at a side of the sample accommodating device 140, and the first light exit LX1 and the second light exit LX2 are located at the other side of the sample accommodating device 140. The first light entrance LE1 is located between the light emitting element 120 and the second light entrance LE2, and the second light entrance LE2 is located between the first light entrance LE1 and the sample accommodating device 140.

Referring to FIG. 2, when the light emitting element 120 receives the trigger signal from the electronic button, the light emitting element 120 emits the illumination beam IB, and the illumination beam IB sequentially passes through the lens L1, the first light entrance LE1 and the second light entrance LE2 and penetrates the sample accommodating device 140 along the optical axis I to be transmitted to the test object OB. Then, the illumination beam IB passing through the test object IB is converted into the sample beam SB, wherein the sample beam SB carries with the optical information of the test object OB. The sample beam SB sequentially passing via the second light exit LX2 and the first light exit LX1 along the optical axis I and penetrating the lens L2 is projected to the slit S of the spectrometer body 220 and enters the spectrometer body 220 through the slit S. The spectrometer body 220 further transmits the sample beam SB to the sensor (not shown) inside the spectrometer body 220 via the optical element (not shown) disposed therein. The spectrometer body 220 obtains the optical information of the test object OB according to the sample beam SB.

Based on the above, in the transmissive sampling module 100 and the spectrometer 200 of the present embodiment, because the adapter element 130 is disposed between the sample accommodating device 140 and the first accommodating tank body 112 of the bearing base 110, the sample accommodating device 140 and the adapter element 130 at least partially surface-contact with each other, and thus, the transmissive sampling module 100 and the transmissive spectrometer 200 are capable of effectively limiting the position of the sample accommodating device 140, such that the position of the sample accommodating device 140 is stable to effectively prevent the test object OB from deviating from the optical axis I of the illumination beam IB. In this way, during the process of sampling, the transmissive sampling module 100 and the transmissive spectrometer 200 may provide a stable sample beam, so as to obtain measurement results with high reproducibility and accuracy.

Additionally, in the present embodiment, the fourth tank surface S4 overlaps with the second tank surface S2 at which the first light exit LX1 is disposed, the adapter element 130 and the second tank surface S2 at least partially surface-contact with each other, and thus, the first accommodating tank body 112 is capable of more effectively limiting the position of the adapter element 130. Moreover, an optical distance of the sample beam SB from the test object OB to the first light exit LX1 may also be reduced, and thus, the accuracy in the measurement of the transmissive sampling module 200 and the transmissive spectrometer 100 of the present embodiment may be increased.

It should be noted that the embodiments which will be described below follow part of the foregoing embodiment while the same technical content is omitted, the description related to the same elements may be inferred with reference to the part of the foregoing embodiment and will not be repeated in the embodiment below.

FIG. 5A through FIG. 5D are schematic appearance diagrams illustrating adapter elements 130a-130c of different embodiments of the invention. FIG. 6A is a schematic partial perspective cross-sectional diagram illustrating a transmissive sampling module applying the adapter element 130c depicted in FIG. 5C according to another embodiment of the invention. FIG. 6B is a schematic partial cross-sectional diagram illustrating a transmissive sampling module applying the adapter element 130c depicted in FIG. 5D according to yet another embodiment of the invention.

Figure 5A:
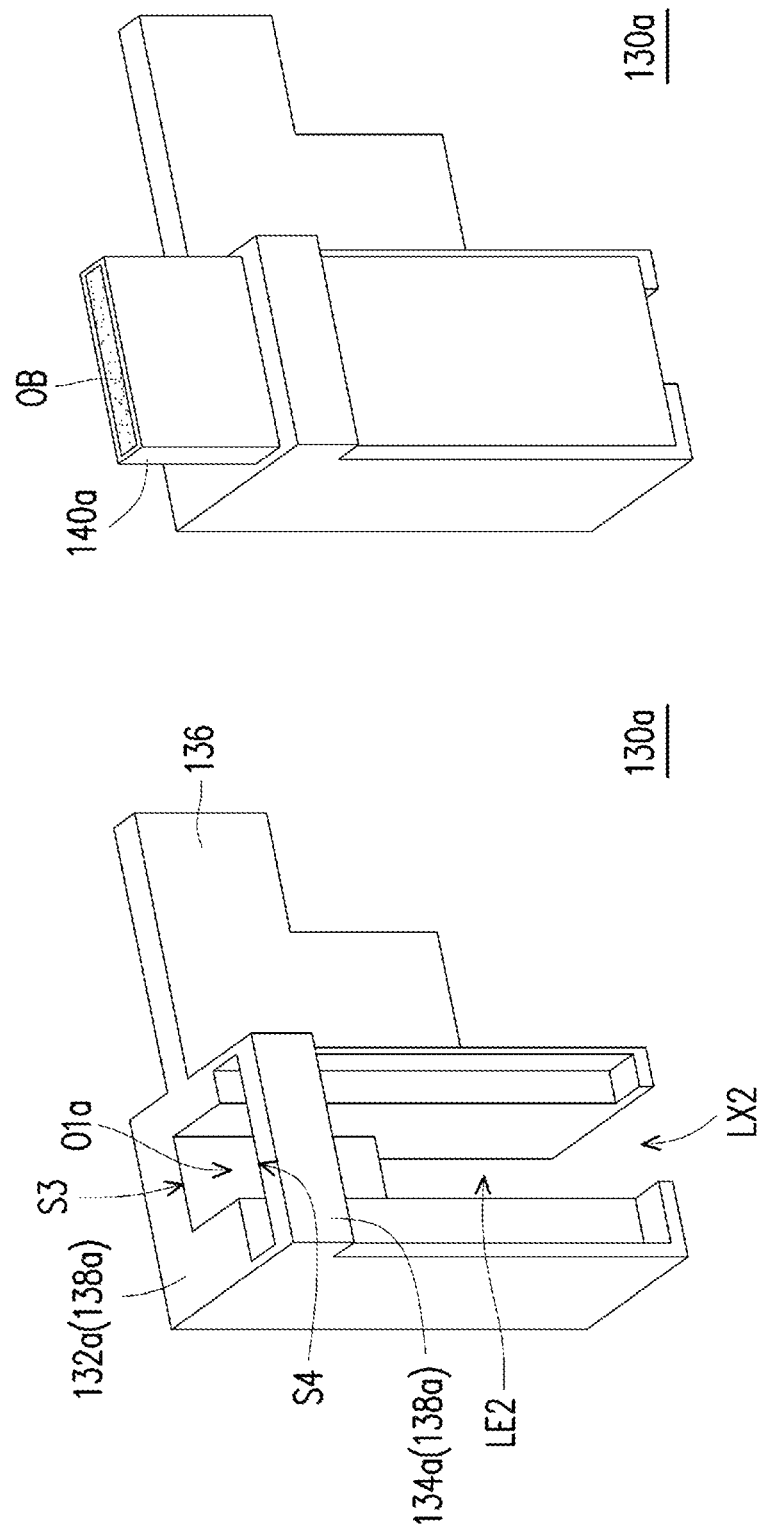
FIG. 5A through FIG. 5D are schematic appearance diagrams illustrating adapter elements of different embodiments of the invention.
Figure 6A:
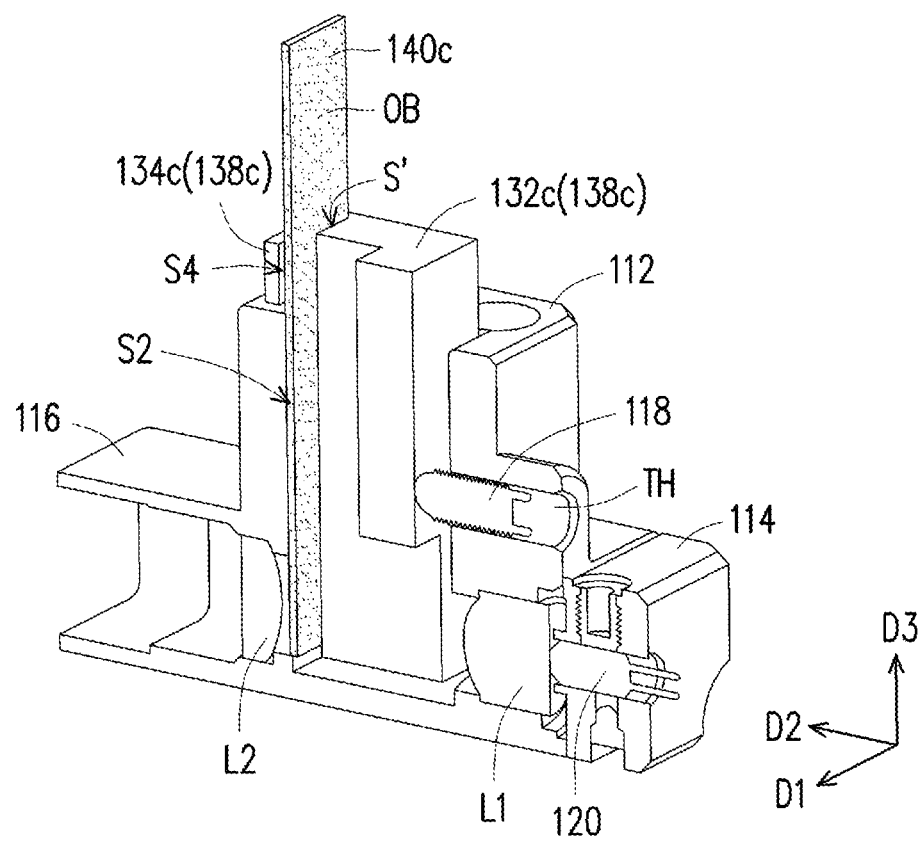
FIG. 6A is a schematic partial perspective cross-sectional diagram illustrating a transmissive sampling module applying the adapter element depicted in FIG. 5C according to another embodiment of the invention.
Figure 6B:
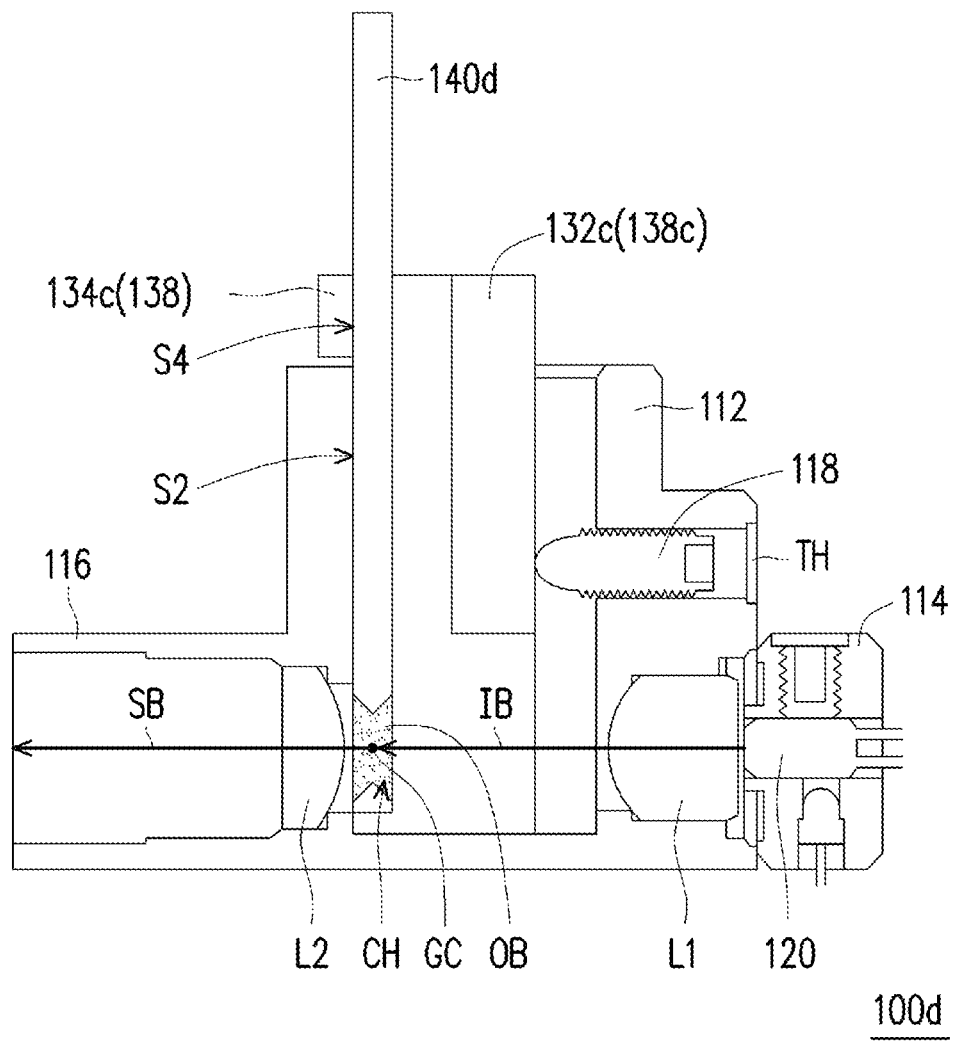
FIG. 6B is a schematic partial cross-sectional diagram illustrating a transmissive sampling module applying the adapter element depicted in FIG. 5D according to yet another embodiment of the invention.

Referring to FIG. 5A first, in the present embodiment, a adapter element 130a is substantially similar to the adapter element 130, and the major difference therebetween lies in a top surface of an abutting rib 134a is substantially aligned with a top surface of a body portion 132a. In other words, the abutting rib 134a does not protrude over the top surface of the body portion 132a. A shape of a first opening O1a of a second accommodating tank body 138a jointly formed by the abutting rib 134a and the body portion 132a is a T-shaped opening. In the embodiment, a sample accommodating device 140a is, for example, a cuboid sample tank, and the sample accommodating device 140a is used to be installed in a corridor-like opening of a part of the T-shaped opening and used to abut against the fourth tank surface S4. On the other hand, the T-shaped opening is favorable for the user to take the test object OB. In the present embodiment, because the sample accommodating device 140a is capable of carrying less test object OB, it is applicable for optical detection performed on the test object OB which has high light absorptivity, a high concentration and less penetration.

Figure 5B:
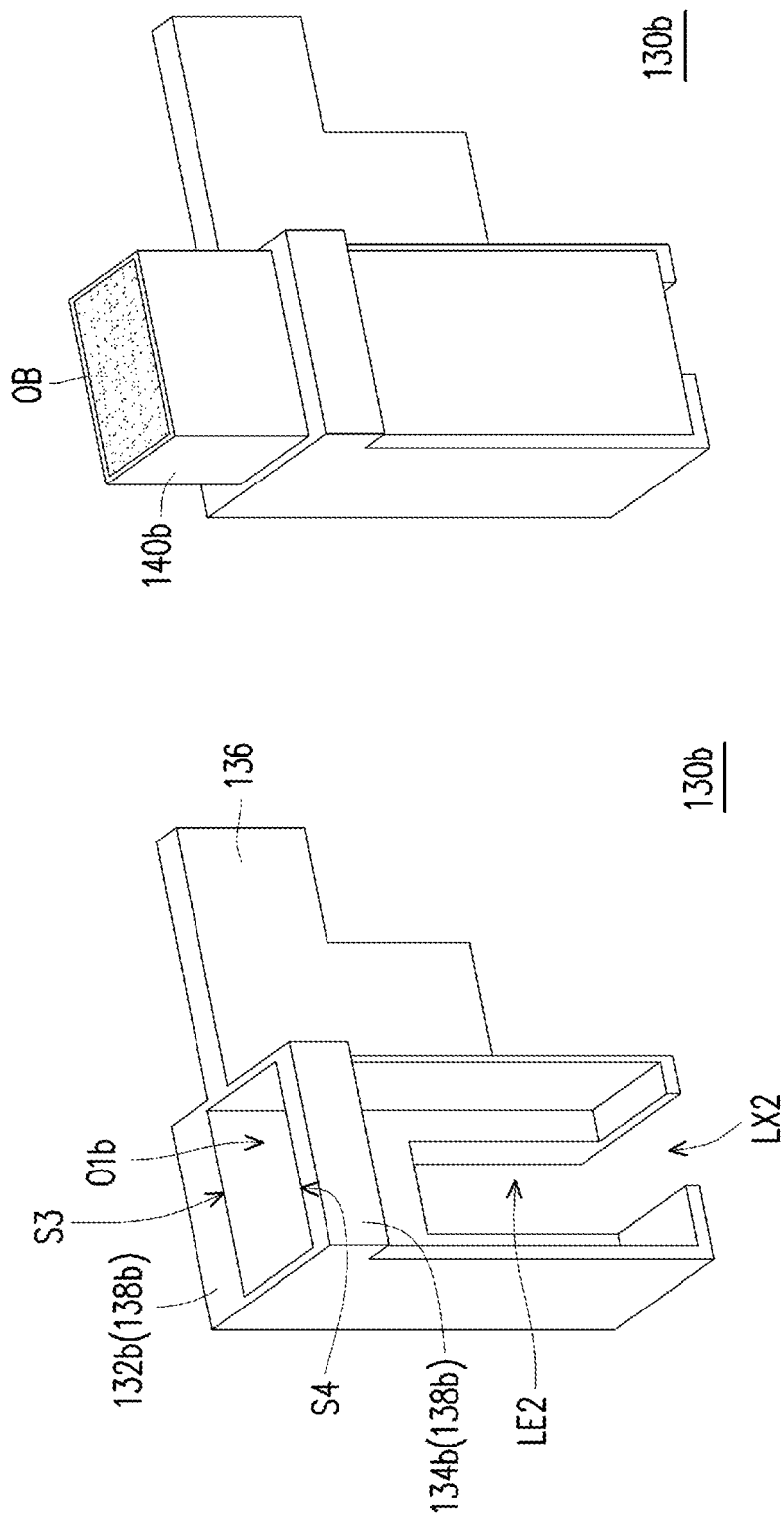

Referring to FIG. 5B, in the present embodiment, an adapter element 130b is substantially similar to the adapter element 130a, and the major difference therebetween lies in a shape of an first opening O1b of a second accommodating tank body 138b jointly formed by an abutting rib 134b and a body portion 132b is a rectangular opening. Moreover, a size of the rectangular opening is greater than a size of the corridor-like opening illustrated in FIG. 5A. In the embodiment, a sample accommodating device 140b is also a cuboid sample tank, for example, and the sample accommodating device 140b is used to be installed in the rectangular opening. In comparison with FIG. 5A, in the present embodiment, because the sample accommodating device 140b is capable of carrying more test object OB, it is applicable for optical detection performed on the test object OB which has low light absorptivity, a low concentration and more penetration.

Figure 5C:
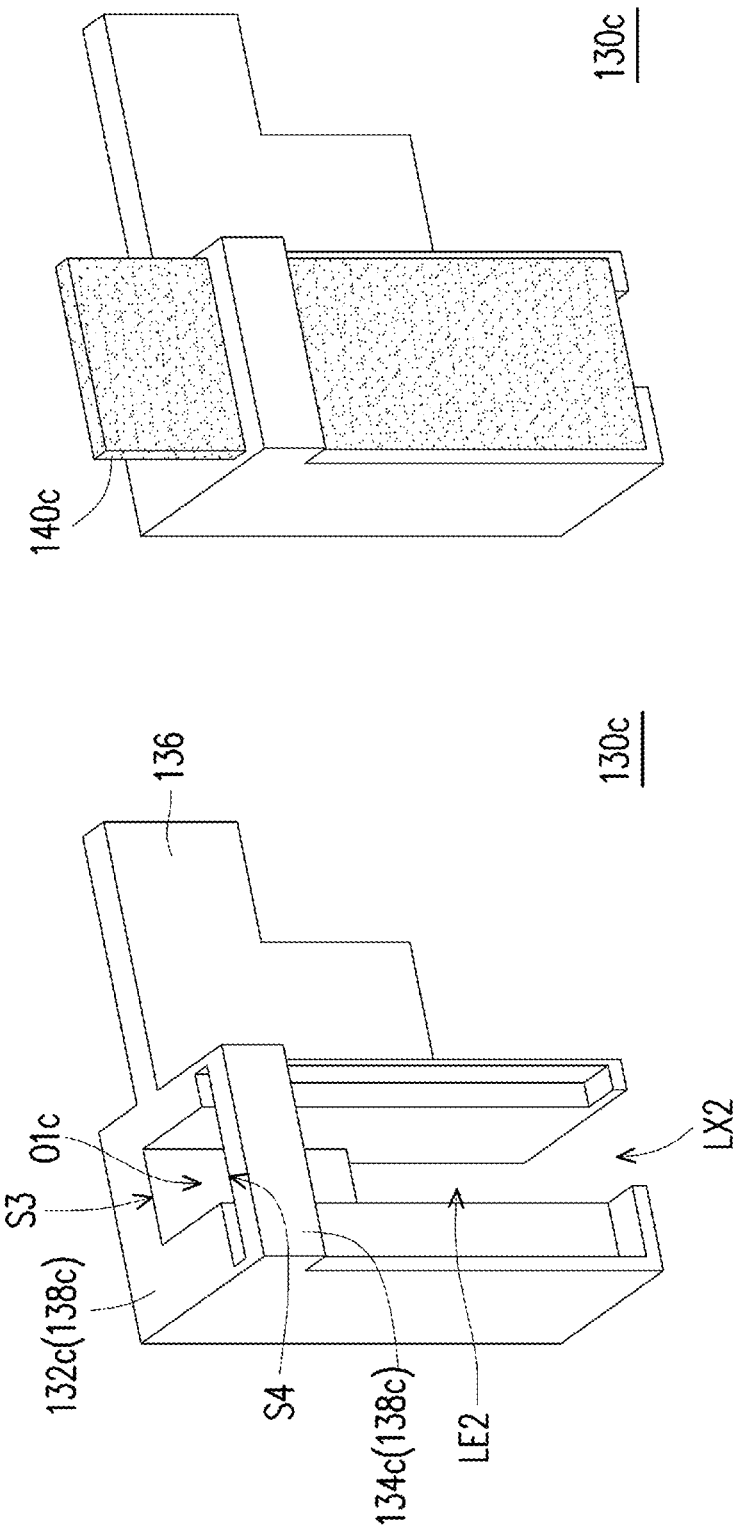

Referring to FIG. 5C, in the present embodiment, an adapter element 130c is substantially similar to the adapter element 130a, and the major difference therebetween lies in a width of a corridor-like opening of a part of a T-shaped opening of a first opening O1c is much smaller, and a range of the width is, for example, smaller than 0.5 mm. The sample accommodating device 140c is, for example, a carrier, and the test object OB is located in the carrier, i.e., the test object OB is integrated in the carrier. The sample accommodating device 140c may be considered as a test film. Referring to FIG. 6A, a body portion 132c of the adapter element 130c further has a surface S' facing an abutting rib 134c. In a transmissive sampling module 100d of the present embodiment, with the positioning element 118 protruding toward the direction D2 and protruding from the through hole TH, the body portion 132c is much pressed by the positioning element 118 for the sample accommodating device 140c (i.e., the test film) to be sandwiched between the body portion 132c and the abutting rib 134c. The sample accommodating device 140c surface-contacts with the fourth tank surface S4 and the surface S' of the T-shaped opening. Thus, a transmissive sampling module 100c of the present embodiment is capable of effectively limiting the test object OB in a test film state, thereby obtaining an accurate measurement result.

Figure 5D:
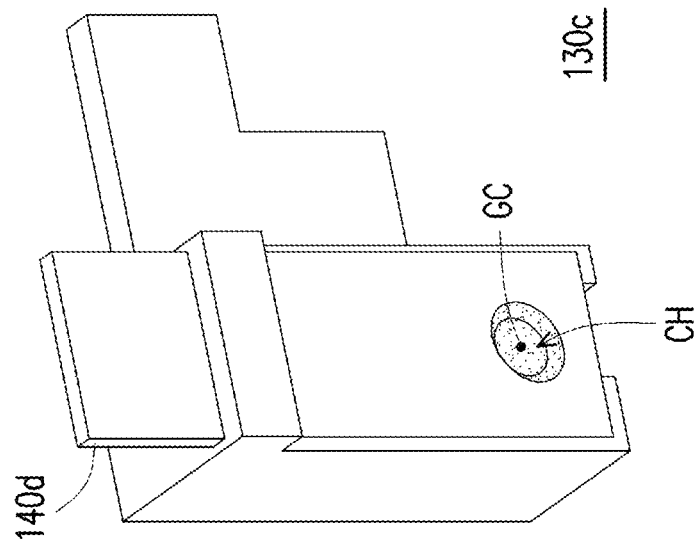
Figure 5D:
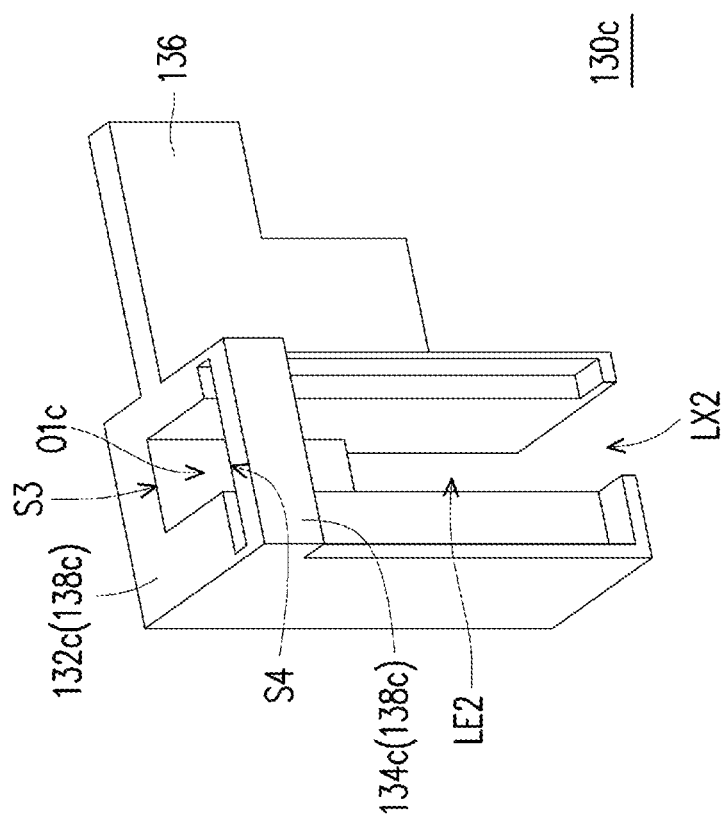

Referring to FIG. 5D, in the present embodiment, the adapter element 130c may be further applied to a sample accommodating device 140d of another implementation aspect. The sample accommodating device 140d is embodied as a carrier, and the carrier has a carrying hole CH. An appearance of the carrying hole CH is, for example, a circular shape with a geometric center GC. The test object OB is disposed in the carrying hole CH. Referring to FIG. 6B, the sample accommodating device 140d may be sandwiched between the body portion 132c and the abutting rib 134c in a manner like that illustrated in FIG. 6A. In the present embodiment, the optical axis I of the light emitting element 120 passes through the geometric center GC. The sample accommodating device 140d in the present embodiment is more adapted for the test object OB with a high concentration, for example, the test object OB is in a paste state.

Based on the above, the embodiments of the invention can achieve at least one of the following advantages or effects. In the transmissive sampling module and the transmissive spectrometer of the embodiments of the invention, because the adapter element is disposed between the sample accommodating device and the first accommodating tank body of the bearing base, the transmissive sampling module and the transmissive spectrometer can effectively limit the position of the sample accommodating device, thereby stabilizing the position of the sample accommodating device to effectively prevent the test object from deviating from the optical axis of the illumination beam. In this way, during the process of sampling, the transmissive sampling module and the transmissive spectrometer can provide a stable sample beam, so as to obtain measurement results with high reproducibility and accuracy. In the embodiments of the invention, the sample accommodating device can surface-contact with the second tank surface of the first accommodating tank body via the second light exit of the adapter element, and because the fourth tank surface overlaps with the second tank surface at which the first light exit is disposed, the distance of the sample beam from the test object to the first light exit can also be reduced. Thus, the accuracy in the measurement of the transmissive sampling module and the transmissive spectrometer of the embodiments of the invention can be increased.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A transmissive sampling module, configured to fix a test object to allow a spectrometer body to obtain an optical information of the test object, the transmissive sampling module comprising a bearing base, a light emitting element, an adapter element, and a sample accommodating device, wherein:

the bearing base comprises a first accommodating tank body, and the first accommodating tank body comprises a first tank surface and a second tank surface opposite to each other, a first light entrance is located at the first tank surface and a first light exit is located at the second tank surface;

the light emitting element is disposed in the bearing base and is configured to emit an illumination beam;

the adapter element is configured to be disposed in the first accommodating tank body and comprises a body portion and an abutting rib extending from the body portion, the body portion and the abutting rib jointly form a second accommodating tank body, and the second accommodating tank body comprises a third tank surface and a fourth tank surface opposite to each other, a second light entrance located at the third tank surface and a second light exit located at the fourth tank surface; and the sample accommodating device is disposed in the second accommodating tank body and at least partially surface-contacting with the second tank surface via the second light exit.

2. The transmissive sampling module according to claim 1, wherein at least a part of the fourth tank surface overlaps with the second tank surface, and the second tank surface is connected with the abutting rib, and the sample accommodating device is configured to accommodate the test object, and the sample accommodating device at least partially surface-contacts with the second tank surface.

3. The transmissive sampling module according to claim 1, wherein the illumination beam sequentially passes through the first light entrance and the second light entrance and is transmitted to the test object in the sample accommodating device, the illumination beam passes through the test object and is converted into a sample beam, the sample beam penetrates the second light exit and the first light exit and is transmitted to the spectrometer body, and the spectrometer body obtains the optical information of the test object according to the sample beam.

4. The transmissive sampling module according to claim 1, wherein the bearing base further has a first slot, the body portion further has a handle, and the handle is embedded in the first slot.

5. The transmissive sampling module according to claim 1, wherein the second accommodating tank body at least partially contacts with an outer surface of the sample accommodating device.

6. The transmissive sampling module according to claim 1, wherein the bearing base further has a positioning element, the first tank surface further has a through hole, and the positioning element passes through the through hole and at least partially protrudes from the through hole to make the adapter element abut against the second tank surface and make the abutting rib abut against the bearing base.

7. The transmissive sampling module according to claim 1, wherein the sample accommodating device is a carrier, the carrier further has a carrying hole, and the test object is disposed in the carrying hole, wherein the carrying hole is located on an optical path of the illumination beam, and an optical axis of the light emitting element passes through a geometric center of the carrying hole.

8. The transmissive sampling module according to claim 1, wherein the second accommodating tank body further comprises a fifth tank surface, and the fifth tank surface is connected with the third tank surface and the fourth tank surface, wherein an outer surface of the sample accommodating device is at least partially conformal with the fourth tank surface and the fifth tank surface of the second accommodating tank body.

9. The transmissive sampling module according to claim 2, further comprising: a plurality of lenses disposed on an optical path of the illumination beam or the sample beam.

10. A transmissive spectrometer, configured to fix a test object to obtain optical information of the test object, the transmissive spectrometer comprising a transmissive sampling module, a protective housing and a spectrometer body, wherein:

the transmissive sampling module is disposed in the protective housing and comprising a bearing base, a light emitting element, an adapter element, and a sample accommodating device, wherein:

the bearing base comprises a first accommodating tank body, and the first accommodating tank body comprises a first tank surface and a second tank surface opposite to each other, a first light entrance is located at the first tank surface and a first light exit is located at the second tank surface;

the light emitting element is disposed in the bearing base and is configured to emit an illumination beam;

the adapter element is disposed in the first accommodating tank body and comprises a body portion and an abutting rib extending from the body portion, the body portion and the abutting rib jointly form a second accommodating tank body, and the second accommodating tank body comprises a third tank surface and a fourth tank surface opposite to each other, a second light entrance located at the third tank surface and a second light exit located at the fourth tank surface; and the sample accommodating device is disposed in the second accommodating tank body and at least partially surface-contacting with the second tank surface via the second light exit; and the spectrometer body is disposed in the protective housing and connected with the bearing base.

11. The transmissive spectrometer according to claim 10, wherein at least a part of the fourth tank surface overlaps with the second tank surface, and the second tank surface is connected with the abutting rib, and the sample accommodating device is configured to accommodate the test object, and the sample accommodating device at least partially surface-contacts with the second tank surface.

12. The transmissive spectrometer according to claim 10, wherein the illumination beam sequentially passes through the first light entrance and the second light entrance and is transmitted to the test object in the sample accommodating device, the illumination beam passes through the test object and is converted into a sample beam, the sample beam penetrates the second light exit and the first light exit and is transmitted to the spectrometer body, and the spectrometer body obtains the optical information of the test object according to the sample beam.

13. The transmissive spectrometer according to claim 10, wherein the bearing base further has a first slot, the body portion further has a handle, and the handle is embedded in the first slot.

14. The transmissive spectrometer according to claim 10, wherein the second accommodating tank body at least partially contacts with an outer surface of the sample accommodating device.

15. The transmissive spectrometer according to claim 10, wherein the bearing base further has a positioning element, the first tank surface further has a through hole, and the positioning element passes through the through hole and at least partially protrudes from the through hole to make the adapter element abut against the second tank surface and make the abutting rib abut against the bearing base.

16. The transmissive spectrometer according to claim 10, wherein the sample accommodating device is a carrier, the carrier further has a carrying hole, and the test object is disposed in the carrying hole, wherein the carrying hole is located on an optical path of the illumination beam, and the optical axis of the light emitting element passes through a geometric center of the carrying hole.

17. The transmissive spectrometer according to claim 10, wherein the second accommodating tank body further comprises a fifth tank surface, and the fifth tank surface is connected with the third tank surface and the fourth tank surface, wherein an outer surface of the sample accommodating device is at least partially conformal with the fourth tank surface and the fifth tank surface of the second accommodating tank body.

18. The transmissive spectrometer according to claim 10, further comprising: a plurality of lenses disposed on an optical path of the illumination beam or the sample beam.

19. The transmissive spectrometer according to claim 10, wherein the protective housing further comprises an upper cover and a lower cover, and the transmissive sampling module and the spectrometer body are disposed between the upper cover and the lower cover.

20. The transmissive spectrometer according to claim 19, wherein the upper cover comprises a first platform portion and a second platform portion connected with each other, the second platform portion comprises a supporting slot and a second slot, and the bearing base is disposed in the supporting slot, and the second slot is disposed in position corresponding to the first slot of the bearing base.

21. The transmissive spectrometer according to claim 19, wherein there is a height difference is between the first platform portion and the second platform portion, and a depth of the supporting slot is equal to the height difference.

22. The transmissive spectrometer according to claim 19, wherein the lower cover further comprises a switch and a transmit port, the switch is configured to turn on or turned off the transmissive spectrometer, a transmission line is configured to be inserted in the transmit port for the transmissive spectrometer to transmit the optical information of the test object to an external electronic device or configured to be connected with an external power supply for the transmissive spectrometer to receive power.

23. The transmissive spectrometer according to claim 19, further comprising an indication module, a wireless communication module and a button, wherein:

the indication module comprises an indicating element;

the wireless communication module is configured to transmit the optical information of the test object to an external electronic device; and the button integrates with the upper cover, and when a force is applied to the button, a trigger signal is generated to trigger the indicating element to emit an indication signal.

\* \* \* \* \*